US012659349B2

(12) United States Patent
Kalapatapu et al.

(10) Patent No.: US 12,659,349 B2
(45) Date of Patent: Jun. 16, 2026

(54) SYSTEMS AND METHODS FOR PROVIDING SYSTEM WIDE CYBER SECURITY POLICIES

(71) Applicant: Cisco Technology, Inc., San Jose, CA (US)

(72) Inventors: Pallavi Kalapatapu, San Jose, CA (US); Nancy Cam-Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 18/340,426

(22) Filed: Jun. 23, 2023

(65) Prior Publication Data
US 2024/0430305 A1 Dec. 26, 2024

(51) Int. Cl.
H04L 9/40 (2022.01)
(52) U.S. Cl.
CPC ..................................... H04L 63/20 (2013.01)
(58) Field of Classification Search
CPC ....................................................... H04L 63/20
See application file for complete search history.

(56) References Cited

U.S. PATENT DOCUMENTS

| | | | |
|---|---|---|---|
| 2014/0380488 A1* | 12/2014 | Datta Ray | ........... H04L 63/1408 726/25 |
| 2015/0365344 A1* | 12/2015 | Manral | ................... H04L 43/10 370/237 |
| 2018/0027022 A1 | 1/2018 | Nagaratnam et al. | |
| 2019/0245734 A1* | 8/2019 | Wu | ........................ H04L 41/145 |
| 2020/0344150 A1* | 10/2020 | Vasseur | .................. H04L 45/64 |
| 2020/0382556 A1 | 12/2020 | Woolward et al. | |
| 2022/0046059 A1 | 2/2022 | Pandurangi et al. | |
| 2022/0210195 A1 | 6/2022 | Parekh et al. | |
| 2022/0269792 A1 | 8/2022 | Rao et al. | |

* cited by examiner

*Primary Examiner* — Oleg Korsak
(74) *Attorney, Agent, or Firm* — Baker Botts L.L.P.

(57) ABSTRACT

Systems and methods for providing system wide cyber security policies include providing a unified security policy to a distributed cloud environment that includes cloud, edge, and local infrastructure. The method includes identifying one or more assets and using telemetry and logs associated with the assets to determine one or more paths connecting the one or more assets. Once one or more paths are determined, the method produces a map of the paths and determines the level of compliance for each. The paths are ranked and a user, such as an administrator or CISO, may be informed of the rankings.

20 Claims, 6 Drawing Sheets

200

220

300

SYSTEMS AND METHODS FOR PROVIDING SYSTEM WIDE CYBER SECURITY POLICIES

TECHNICAL FIELD

The present disclosure relates generally to cyber security, and more particularly to systems and methods for providing system wide cyber security policies.

BACKGROUND

Organizations in the recent past have increasingly utilized cloud environments to provide some or all their computing needs. The use of a cloud environment provided for massive rewards of visibility, elasticity, agility, flexibility, scale, security, and cost effectiveness. However, organizations have now begun to bring at least some computing back to a more local environment, such as the so-called edge computing environment. The edge computing environment allows some computing to be performed closer to the end users or organization while still having some of the benefits of the cloud environment. The edge computing environment overcomes some of the deficiencies with cloud environments, such as bandwidth, latency, regulatory and/or privacy concerns. However, this brings new issues as the security policies and security related equipment and/or applications that are needed for the edge environment may not be the same as those needed for a cloud environment or a local client/datacenter.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems and components depicted in the accompanying figures are not to scale and components within the figures may be depicted not to scale with each other.

DESCRIPTION OF EXAMPLE EMBODIMENTS

Overview

Figure 1A:
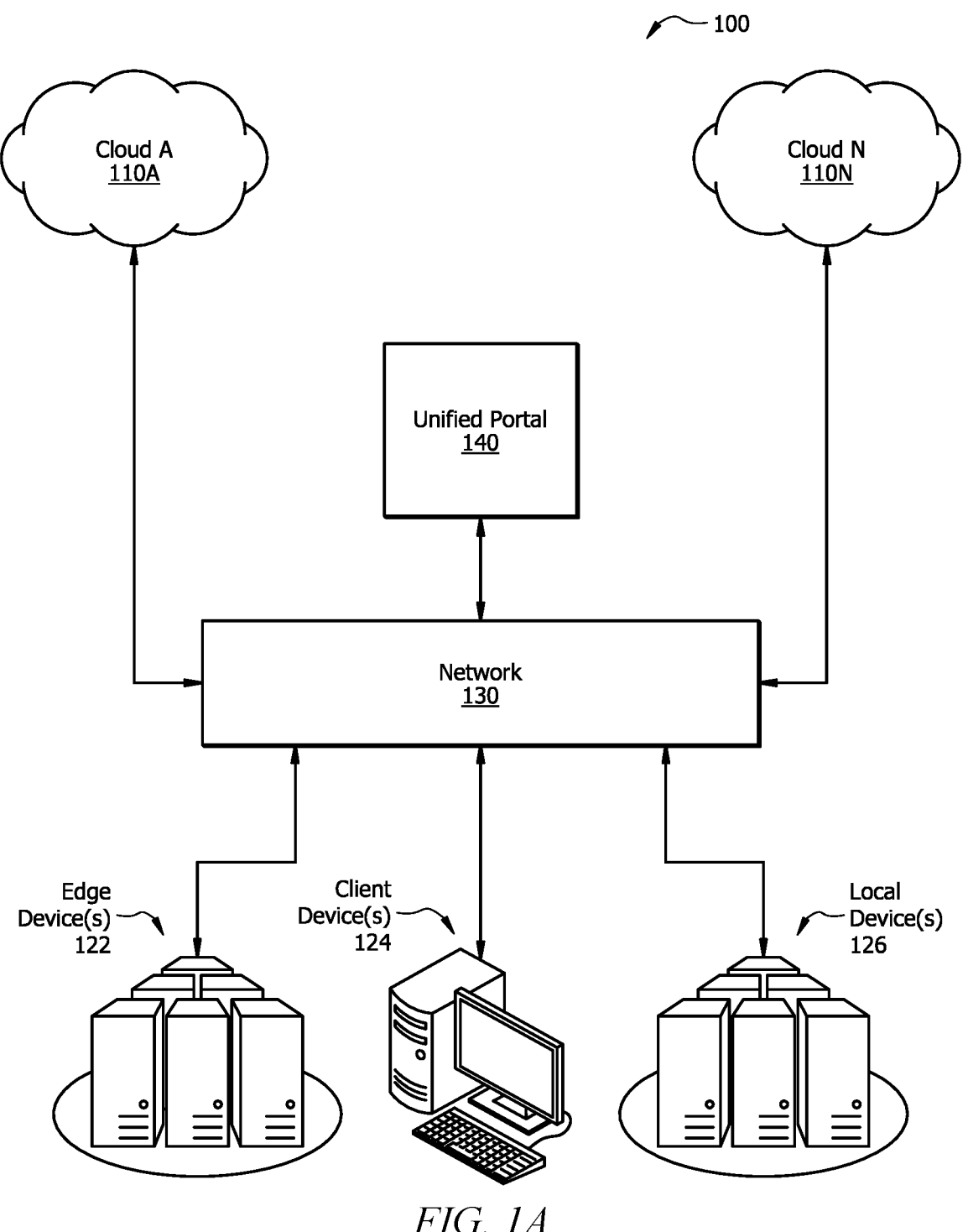
FIG. 1A illustrates a system diagram of a network architecture for performing one or more embodiments.

One or more embodiments comprise a method that includes identifying one or more assets and receiving telemetry and logs associated with the one or more assets. Telemetry and logs are then used for identifying one or more paths that connect the one or more assets and produce one or more maps of the paths between the assets. The maps are used to determine a level of compliance with the security policy and ranking the various paths. These rankings are then sent to an appropriate user, administrator developer, etc.

In one or more embodiments, aspects of the security policy that are not compatible with a specific node, path or asset are identified. Appropriate personnel such as the developer are notified of the aspects of the security policy that are not compatible or in general not complied with so that changes may be made early during the development paradigm and throughout the life of the asset/nodes. Either the nodes or the asset itself may then be updated to comply with the identified aspects of the security policy. When a specific node and/or path cannot be easily upgraded to comply with the security policy, one or more embodiments may restrict the use of the specific node or path when a higher complying path/node is capable of providing the same or similar level of service.

This disclosure additionally describes a system that comprises one or more nodes hosting one or more assets. The system further includes a unified portal which includes one or more processors and memory coupled to the one or more processors. The memory stores instructions operable when executed by one or more of the processors to cause the unified portal to perform a method. The method includes identifying one or more assets and receiving telemetry and logs associated with the one or more assets. Telemetry and logs are then used for identifying one or more paths that connect the one or more assets and produce one or more maps of the paths between the assets. The maps are used to determine a level of compliance with the security policy and rank the various paths. These rankings are then sent to an appropriate user, administrator developer, etc.

This disclosure also describes at least one non-transitory computer-readable storage medium having stored instructions. When the instructions are executed by one or more processors, the instructions cause the processors to identify one or more assets and receive telemetry and logs associated with the one or more assets. Telemetry and logs are then used for identifying one or more paths that connect the one or more assets and produce one or more maps of the paths between the assets. The maps are used to determine a level of compliance with the security policy and ranking the various paths. These rankings are then sent to an appropriate user, administrator developer, etc.

Certain systems and methods described herein may allow for providing and maintaining a unified security policy across a distributed cloud environment. By ensuring that administrators and developers, as well as other concerned parties, are made aware of the security policy for any individual asset and the related nodes with which it interacts, they are able to have a more holistic view and make appropriate decisions concerning security policy, changes through the development cycle to the asset, make changes to the nodes or paths in order to provide a unified security policy. Additionally or instead, the administrators may make appropriate changes where the current security policy is insufficient.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The present disclosure describes an approach that allows for establishing a unified security policy in a distributed cloud environment. The distributed cloud allows an organization to utilize a hybrid combination of traditional cloud datacenters, local datacenters, and edge datacenters, and subsequently manage them as a unified system. However, formulating and implanting a unified security policy for these diverse (both geographically and compositionally) systems remains a challenge. The present disclosure seeks to address this by introducing a shift rotate continuous defense layer.

A Chief Information Security Officer's (CISO) primary responsibility is to secure an organization's cyber assets, however, in distributed cloud environments, the CISO often lacks visibility and control across all lines of business and development. Different teams often choose their own tools and processes to best meet their business objectives, resulting in inconsistent and incomplete approaches to cyber security. The CISO must achieve heightened security visibility, posture, compliance, and consistency in policy and controls while maintaining the productivity and value of cloud-native applications. It is possible for developer and operation teams to deploy code, infrastructure services and infrastructure with much greater agility without the involvement of traditional IT or security personnel.

To catch and remediate security risks before they reach production, developers are embracing the "shift-left" trend that requires direct integration into development lifecycle. For a developer, shifting left gives some control over instrumenting security measures in the resulting code. However, it only provides partial control, as it lacks visibility into the production capabilities at the infrastructure level and the potential path of application traversal. This becomes a problem primarily for dynamically federated applications on uneven security planes. Therefore, it is imperative that developers, operations, and security teams have full visibility into the potential paths an application could take during its course and should not be limited to vigilance on the current path of the application. Unless developer, operations and security teams have access to this information, they will not be able to add proactive security instrumentation and end up in a reactive ally rather than proactive processing. It is in the best interest of the CISOs to get this gap addressed so the organizations can build more robust and proactive security measures.

A modern cloud-native application should be instrumented to support deployment agnostic conditions, allowing dynamic deployment of portions of applications over a distributed network to meet performance, security, and operational knowledge performance indicators (KPIs). Nevertheless, it is important to keep in mind that developers have a limited view of the production stack and rely heavily on static instrumentation. Developers are disconnected from the dynamic shifts in the production pipelines. There is a need for visibility on the development dynamics to continuously assess and protect distributed applications.

The present disclosure can augment security posture by extending continuous visibility pipelines across the distributed cloud continuum to close the loop on the developer visibility and deployment conditions. Having visibility beyond shift left operations enables developers, operations, security, and CISOs to have a tighter collaboration and be able to bolt in robust security guard rails across the distributed cloud environments.

The present disclosure utilizes a shift rotate continuous defense layer that may be added to a unified portal or may serve as a stand-alone component. For a given asset such as an application, database, web hosting service, application programing interface (API), or any other asset that may be used across multiple systems (cloud, edge, local, etc.), the shift-rotate defense module 144 discovers other assets the given asset communicates with and the various paths that it utilizes to communicate to different paths as well as the different pertinent systems. The paths and assets may then be monitored to determine their level of compliance with the security policies as well as their capabilities. Based on this, the concerned parties (developers, security, operations, etc.) may make appropriate changes to either ensure that the asset only uses a path and other assets that meet the desired security policy or by making other alternations as necessary to insure compliance without disrupting operations.

In one or more embodiments, the method is performed on a system that comprises of both cloud and edge infrastructure. The method allows for concerned parties, both those working on assets primarily located on the cloud environment and those located primarily in the edge infrastructure to be aware of the security concerns of each environment. This may be assisted by analyzing the paths between assets as well as the assets utilizing machine learning to assess a current and predicted level of compliance and rank different paths from high-to-low to produce the notification for the user/administrator/CISO etc.

The various aspects may be implemented in many different forms and should not be construed as limited to the implementations set forth herein. The disclosure encompasses variations of the embodiments, as described herein. Like numbers refer to like elements throughout.

FIG. 1A illustrates a system diagram of an example system for performing shift-rotate security according to some aspects of the current disclosure. FIG. 1A further illustrates a distributed cloud environment 100. The distributed cloud environment 100 includes a system architecture that includes two or more cloud environments 110A-110N, edge computing devices 122, client devices 124, and local devices 126 such as one or more local datacenters. The distributed cloud environment 100 may include more or less devices and environments than that shown in FIG. 1A. The system further includes a network 130 that connects the cloud environments 110A-110N, edge computing devices 122, client devices 124, and local devices 126 with a unified portal 140.

In some examples, the network 130 may include devices housed or located in one or more of the computing devices 122, 124, 126 and or the datacenters that form the cloud environments 110A-110N. The network 130 may include one or more networks implemented by any viable communication technology, such as wired and/or wireless modalities and/or technologies. The network 130 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc. Wide Area Networks (WANs)—both centralized and/or distributed—and/or any combination permutation, and/or aggregation thereof. The network 130 may include devices, virtual resources, or other nodes that relay packets from one network segment to another by nodes in the computer network. The network 130 may include multiple devices that utilize the network layer (and/or session layer, transport layer, etc.) in the OSI model for packet forwarding, and/or other layers. The network 130 may include various hardware devices, such as routers, switches, gateways, smart NICs, NICs, ASICs, FPGAs, servers, and/or any other type of devices. Further, the network 130 may include virtual resources, such as VMs, containers, and/or other virtual resources. Additionally, or alternately, the techniques described herein are applicable to container technology, such as Docker®, Kubernetes®, and so forth.

The one or more cloud environments 110A-110N may comprise of one or more data centers that are located/hosted external to the organization. The cloud environments may provide data storage and/or computing power and are often provided on an on-demand basis. The cloud environment(s) may provide a variety of tiers of service that may be reconfigured on demand as needed. This allows the organization to have agility in responding to changing needs and to efficiently use available resources (at least from an economic as well as energy use perspective).

For example, in a non-limiting example, a cloud environment 110A may host a database associated with an under-utilized product, however due to advertising or other reasons, the product becomes popular. With a cloud environment, the organization can quickly reconfigure or purchase additional computing capacity to handle the additional data and interactions with the database. When the product is no-longer popular, the extra capacity can easily be removed or re-dedicated to another product as needed. This flexibility is an advantage of cloud environments.

Further depending on availability or capabilities, an organization may choose to use a plurality of different cloud environments 110A-110N to host various services/data in environments that meet geographical needs, security needs, and performance needs. Additionally with cloud environments a unified security policy may be more easily implemented. Cloud environments typically can provide as good as or better security then that of a local computing environment. Because of centralization as well as scale, cloud service providers can devote resources to solving security issues that many customers cannot afford and/or have the ability to implement locally. However, because the cloud environment may be geographically located far away from the organization and because cloud installations can be complex, including with regards to different regulatory paradigms, alternatives to the cloud environment are often needed.

One such alternative is an edge computing environment comprising one or more edge computing devices 122. Edge computing devices 122, much like cloud devices/environments, include one or more datacenters and/or servers. However, unlike cloud environments, the edge servers/datacenters are generally located in an organization's datacenter or in small deployments near potential customers. The one or more edge computing devices and/or local devices 122 and 126, respectively, may be physical facilities or buildings located across geographic areas that are designated to store networked services that are part of the network 130. The edge computing devices 122 may include various networking devices, as well as redundant or backup components and infrastructure for power supply, data communications connections, environmental controls, and various security devices. Generally, the edge computing devices 122 may provide basic resources such as processor (CPU), memory (RAM), storage (disk), and networking (band-width).

Because the edge computing devices are located in an organization's own datacenters or nearer to the end users, it is easier to implement local regulations and data retention policies that might not be possible with the third-party cloud environments 110N. Further, because the organization rather than a third party usually controls and maintains the edge computing devices, the organization can implement its custom security policies more easily with the edge computing devices 122 rather than that of the cloud environment 110N.

Most organizations also maintain one or more local devices/servers/datacenters 126. These may be in addition or separate from the edge computing devices 122. Like the edge computing devices 122, the local devices 126 may include various networking devices, as well as redundant or backup components and infrastructure for power supply, data communications connections, environmental controls, and various security devices. Generally, the local devices 126 may provide basic resources such as processor (CPU), memory (RAM), storage (disk), and networking (band-width). The local devices 126 may provide the best data security since they are located at the organization's own facilities and do not share computing with any other organization. However, because they are smaller systems than the cloud environment 110N and edge computing devices 122, the local devices 126 may not have the capability or may be too limited in scope to implement each of the security features that are present in cloud environment 110N and edge computing devices 122. Further, while a cloud provider may be able to have teams of security operations personnel, the amount of those present to monitor and defend a local device may be limited.

In order to address this and other issues, one or more embodiments provide a unified portal 140 that will be described in more detail below with regards to FIG. 1B. The unified portal 140 provides capabilities for IT personnel and other pertinent people in an organization to monitor and implement security policies across the various types of computing devices/environments that the organization utilizes. In one or more embodiments, a security administrator or networking company or other concerned party may access the unified portal 140 from their client devices 124.

A user, such as an administrator and/or customer, may access one or more aspects of the system through a client device 124. A client device 124 may be any computational device such as those described with regards to FIG. 4 below. The client device 124 may be connected to the cloud environment 110A-N, edge computing device 122 and local devices 126 through the network 130. The client device 124 may be located with the local device 126, or in a separate geographical location. The client device 124 may be an end-user's device. In one or more embodiments, the client device 124 may allow an administrator or other concerned party such as the networking company to access the unified portal 140.

Figure 1B:
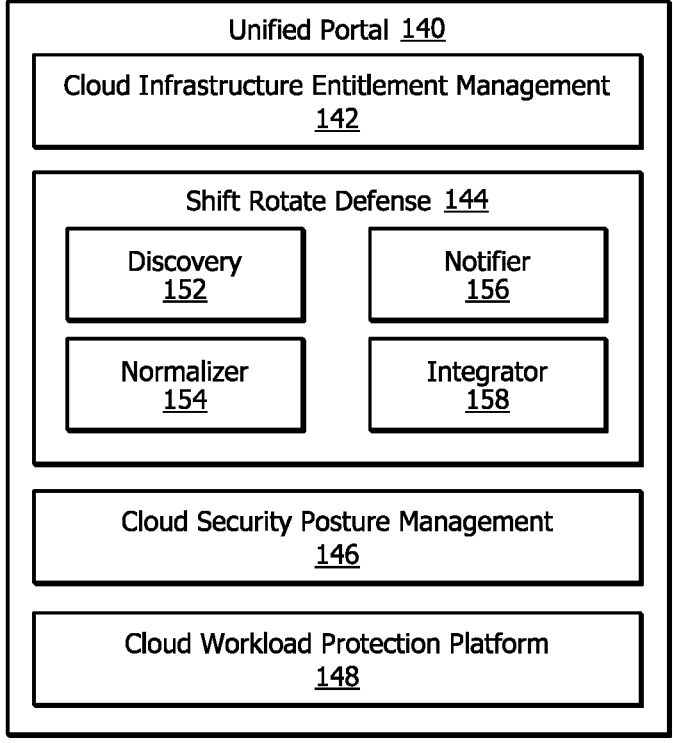
FIG. 1B illustrates a detailed description of the unified portal in accordance with one or more embodiments.

FIG. 1B illustrates a component diagram of an example unified portal 140 that may be utilized to implement aspects of the technologies disclosed herein. The unified portal 140 may be any type of computing device, including a plurality of computing devices and/or virtual computing devices, capable of monitoring and/or managing an organization's distributed cloud system.

As illustrated, the unified portal 140 may include a plurality of modules, such as a cloud infrastructure entitlement management module 142, a shift-rotate defense module 144, a cloud security posture management module 146, and a cloud workload protection platform 148. These modules may be virtual and/or one or more may be implemented by a stand-alone server or computational device configured to execute one or more stored instructions, such as that described with regards to FIG. 4.

Although not shown, the unified portal 140 may also include one or more network interfaces for communicating with a network 130, such as the Internet and/or a local network and provide communication with other components of the distributed cloud environment 100 as described above with respect to FIG. 1A. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi, and so forth.

It will be appreciated that the unified portal 140 might not include all the components shown in FIG. 1B and may include other components that are not explicitly shown in FIG. 1B or might utilize an architecture completely different than that shown in FIG. 1B. The unified portal 140 includes a cloud infrastructure entitlement management (CIEM) module 142. The CIEM 142 manages and identifies privileges in the cloud environment. It allows security teams to manage cloud identities, entitlements, and enforce the principle of least-privilege access to cloud infrastructure and resources. The CIEM 142 works together with the cloud security posture management (CSPM) module 146, which provides automatic data security across the distributed cloud environment.

The CSPM 146 performs automatic security monitoring and automatic remediation when problems are detected. The CSPM 146 utilizes and enforces the security policies that are prepared by the CIEM 142 as well as the shift-rotate defense module 144. While the CSPM 146 works to implement security policies in the cloud environment 110A-N, the cloud workload protection platform (CWPP) 148 works to implement the security policies across the hybrid environment. It addresses both the multi-cloud and local data center environments.

Utilizing the combination of the CIEM 142, CSPM 146, and CWPP 148, the unified portal 140 may apply a security policy using a central policy push. However, in a distributed cloud environment with non-homogenous capabilities, edge computing devices may have limited physical security capabilities compared to the public cloud or data centers. This limits the capabilities of the CIEM 142, CSPM 146, and CWPP 148 to implement the security policies, since the CIEM 142, CSPM 146, and CWPP 148 may not be aware of the deficiencies of the edge devices and/or one or more of the local devices.

In one or more embodiments, a shift-rotate defense module 144 is added to the unified portal 140 to address these concerns. The shift-rotate defense module 144 may include a discovery module 152, a normalizer module 154, an integrator module 158, and a notifier 156. The shift-rotate defense module 144 continuously monitors the edge computing devices 122, local devices 126, and cloud environments 110N, and when a vulnerability is encountered, the shift-rotate defense module 144 ensures awareness of the vulnerability across the distributed cloud. In order to do this, the shift-rotate defense module 144, is made aware of the paths that connect various assets across the various physical computing environments (edge, datacenter, cloud, etc.).

The shift-rotate defense module 144 may be implemented on a computational device that is part of the local device 126, edge computing device 122, or even one or more devices associated with the cloud environment(s) 110A-N. The shift-rotate defense module 144 may include or be implemented on computer-readable media that stores various executable components (e.g., software-based components, firmware-base components, etc.). The memory may generally store components to implement functionality described herein including machine learning used by one or more of the components (discovery module 152, normalizer module 154, notifier 156, and integrator module 158). Further, the memory may store a communication component that comprises software (e.g., any protocol stack) to enable the shift-rotate defense module 144 to communicate with other devices using the network 130. The communication component may also include mechanisms to encode, decode and process the communication signals transmitting/receiving to/from other devices.

In one or more embodiments, the shift-rotate defense module 144 includes a discovery module 152. The discovery module 152 monitors telemetry as well as logs to discover the assets, such as applications, databases, web hosts, virtual machines, etc. that are hosted by the various devices of the distributed cloud environment 100. The discovery module 152 determines the communication paths between the various assets and the various devices and maps these paths (exemplary maps are shown and described below with regards to FIGS. 2A and 2B). The discovery module 152 also works to identify which security policies are implemented on each node and path to determine the compliance of an asset with the security policies.

In at least some embodiments, the discovery module 152 or other component of the shift-rotate defense module 144 and/or unified portal 140 may use machine learning (ML) to analyze the telemetry and logs to determine the compliance with the security policies. In various embodiments, the discovery module 152 may include an ML based engine (not shown) that is able to understand the dynamics of the monitored network, paths, and endpoints to predict and identify potential network security issues and/or compliance. The ML engine may use any number of machine learning models to perform the methods described herein, such as predictive analysis and/or trending analytics as further described.

Cognitive Analytics Model(s): The aim of cognitive analytics is to find behavioral patterns in complex and unstructured datasets. For the sake of illustration, an ML engine may be able to extract patterns of network use and system use as well as other behaviors. The ML engine may characterize such patterns by the nature of the endpoint devices (e.g., device type, OS) and/or assets or applications that are accessed at each node or along the path. The ML engine may also cauterize the patterns/paths according to the place in the network, time of day, routing topology, type of AP/WLC, etc., and potentially correlate with other network metrics (e.g., application, QoS, etc.).

Predictive Analytics Model(s): These may be configured to predict user experiences, which is a significant paradigm shift from reactive approaches to network health. For example, an ML engine may be configured to build predictive models for congestion on each of the paths by considering a plurality of parameters/observations (e.g., time of day, number of clients, traffic load, etc.). From this, the ML engine can determine if a particular path is not needed as well as its level or ranking with regard to the security policy. The predictive analytics model(s) of the ML engine may also be able to predict other metrics, such as the expected throughput for a client using a specific application. In yet another example, the predictive analytics model(s) may predict future compliance with the security policies and these predictions may also be used to make preemptive changes to the asset, nodes, paths, and/or security policies. As would be appreciated, this approach may be far superior to traditional approaches that rely on detecting when performance has dropped below a predetermined threshold, or a security failure has occurred.

Trending Analytics Model(s): The trending analytics model(s) may include multivariate models that can predict future states of the network, thus separating noise from actual system trends. Such predictions can be used, for example, for purposes of capacity planning and other "what-if" scenarios. The ML engine may be specifically tailored for use in cases in which machine learning is the only viable approach due to the high dimensionality of the dataset and patterns cannot otherwise be understood and learned. For example, finding a pattern so as to predict how an asset reacts to a threat, is difficult using predefined rules. This is especially true when the asset utilizes data from both a cloud and an edge environment with complex network routing.

Returning to FIG. 1B, once the maps are produced by the discovery module 152, the normalizer module 154 seeks to implement the security policies across the nodes/paths for a given asset. This may include having the CSPM 146 and CWPP 148 implement new security policies automatically across the edge computing device or a cloud device or modify the security policies so that they are consistent across devices.

Where a particular security policy cannot be implemented, the shift-rotate defense module 144 then has a notifier 156 notify the user, such as a system operations administrator, IT personnel, developer(s), or other pertinent personnel. The notifier 156 may utilize a graphical user interface (GUI) hosted on a client device 124 that displays to the pertinent user the network paths and nodes that a particular asset typically uses such as what is shown in the exemplary asset mapping in FIGS. 2A and 2B. The GUI may also show what security policies a particular node (network device or application that a particular asset interacts with during normal operations) has implemented and/or is capable of implementing. The GUI may also display alternative paths that an asset may use that have higher security policy compliance.

In one or more embodiments, the notifier 156 together with the discovery module 152 works to rank the various paths that an asset uses. By ranking the paths based on their level of compliance, the GUI may be able to indicate what the lowest ranked path is and what the highest ranked path is. The ranking may be done based on the specific needs of the organization as well as the particular asset an administrator may wish to choose as the lowest or the highest ranked path. Because the lowest ranked path may be sufficient for a particular asset (such as a web application that does not handle sensitive information), the administrator may not wish to change what nodes/paths the asset utilizes. However, in the case when an asset (such as a payment application) needs to comply with higher security, the administrator may eliminate the lower ranked paths and only use the higher ranked paths, despite the higher ranked path potentially handling the asset in a less efficient manner. The notifier 156 may display more or less information than what is described herein.

Once the user/administrators/security team/networking company has been notified by the notifier 156 of the compliance of the asset with the security policies, the integrator module 158 combined with the normalizer module 154 and other components of the unified portal 140 may implement any necessary changes automatically or manually through the intervention of one or more administrators/security team members.

Figure 2A:
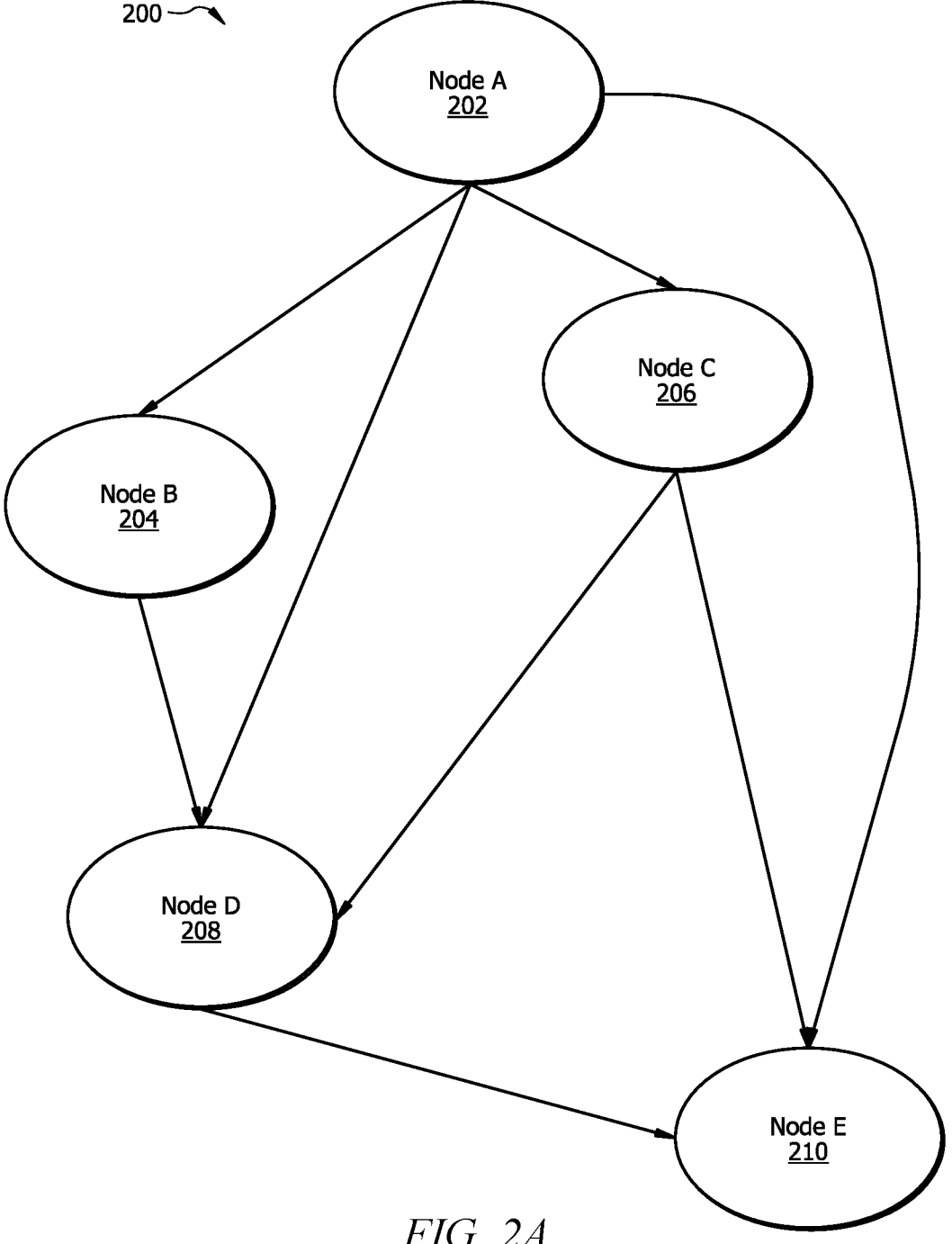
FIG. 2A illustrates an example of a first asset traversal path in accordance with at least one embodiment.
Figure 2B:
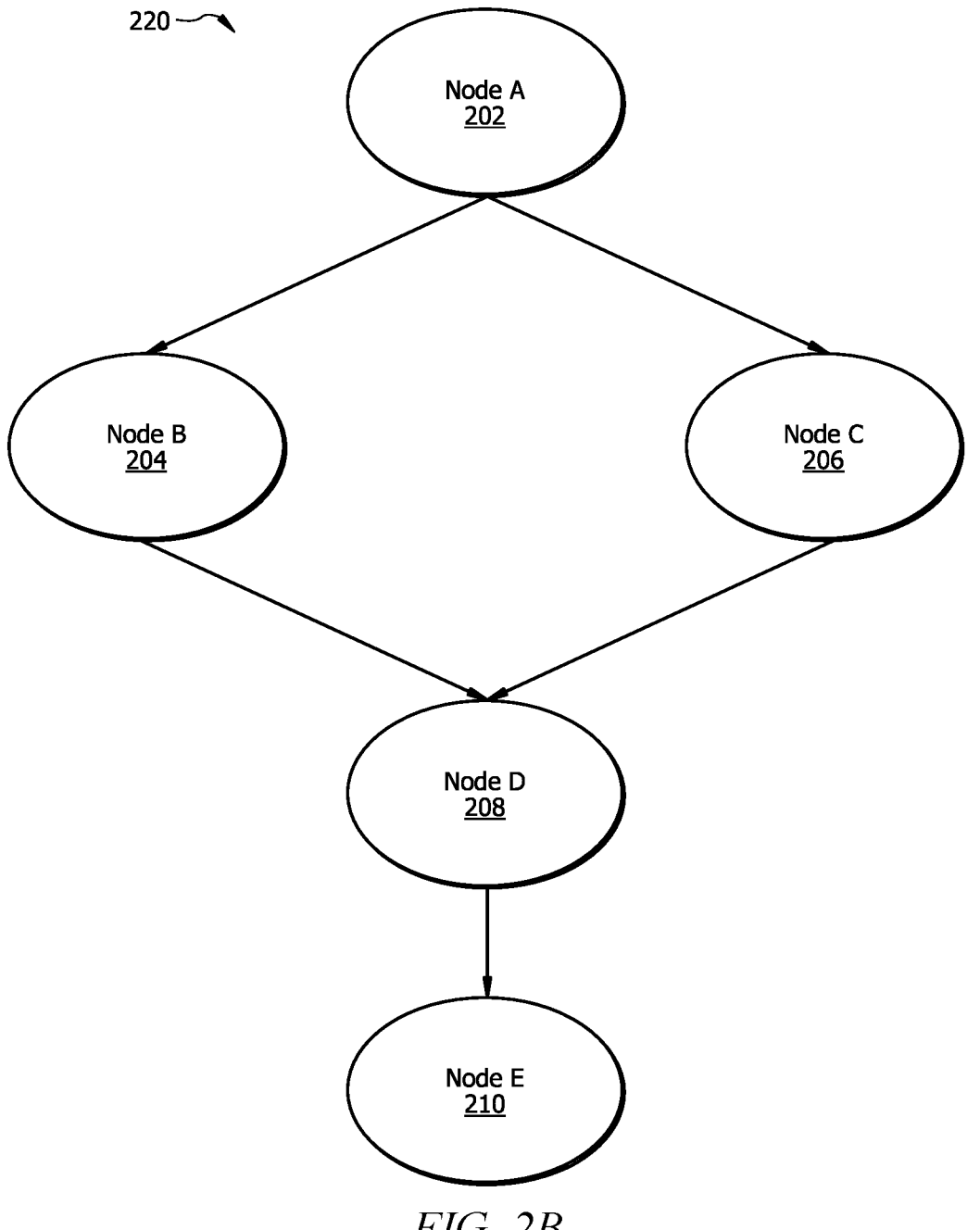
FIG. 2B illustrates an example of a second asset traversal path in accordance with at least one embodiment.

FIGS. 2A and 2B show an exemplary mapping 200 for a given asset. The mapping 200 may be produced by the discovery module 152 shown and described above with regards to FIG. 1B. Alternatively, any of the components described in FIGS. 1A and 1B may have produced the mappings 200 shown in FIGS. 2A and 2B.

FIG. 2A shows a mapping 200 where there are multiple paths between multiple nodes 202-210. Each of the nodes 202-210 may include different datacenters, applications, database, routers or other processes or devices that a given asset interacts with to perform one or more of its functions. For example, if node A 202 is an application, it may need to communicate with a second node B 204, which hosts a second application that gets data from a database on node D 208. Application/node A 202 may also need to use the resources of a third application hosted on node E 210, which also uses the data from the database on node D 208. In order for the first node/application to communicate with node E 210, it may either go through node B 204 and D 208 or node C 206 along various communication paths. If, for example, node C 206 does not comply with the security policies, this may cause issues in accessing the information on node D 208 and node E 210.

In one or more embodiments, each path between node A 202 and node E 210 would be mapped and ranked based on their compliance with a security policy. If it is found that at least one path is not necessary or out of compliance, then the paths may be changed by an administrator or automatic process to use those paths providing a desired level of security and performance. Such a change is shown in FIG. 2B, where extra paths have been eliminated in the mapping 220, resulting in a more efficient system. Specifically, node A 202 communicates through either node B 204 or node C 206 with node D 208. Node D 208 may then access node E 210. Using the Example described above with regards to the mapping shown in FIG. 2A, if node A 202 is an application and node D 208 is a database, then using the mapping in FIG. 2B, the application hosted by node A 202 has two paths to the database node D 208 which is less complicated and easier to ensure compliance with the security policy.

Figure 3:
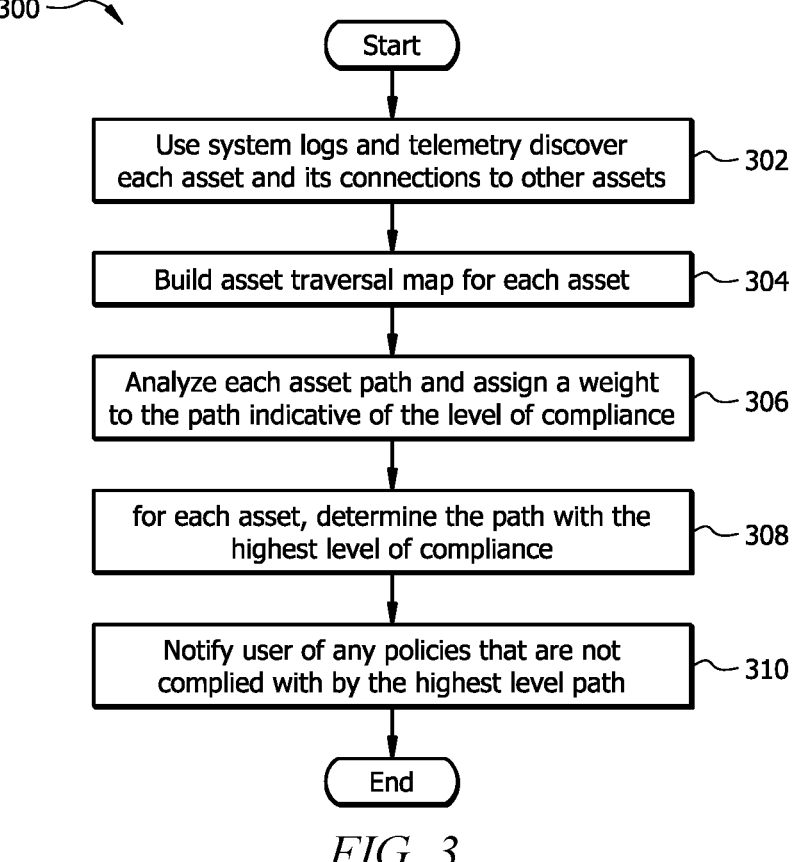
FIG. 3 illustrates a flow diagram of an example method for determining compliance with a security policy for an asset path.

FIG. 3 illustrates an exemplary method 300 for building a transversal map for each asset and assigning a ranking to particular paths, in accordance with one or more embodiments.

At step 302, in one or more embodiments, the unified portal 140, such as that described above with regards to FIGS. 1A and 1B, obtains system logs and telemetry throughout the distributed cloud environment 100. The unified portal 140 determines the identity of each asset, such as an application, database, etc. as well as where they are hosted and what other components/assets of the distributed cloud environment 100 they communicate with or interact with.

Once the asset and connections are discovered in step 302, an asset traversal map is prepared for each asset in step 304. An exemplary asset map is described above with regards to FIGS. 2A and 2B, however, any mapping including a table of connections may be used. By analyzing the asset and those nodes that the asset communicates with, the paths connecting or traversed by the asset to each node and/or other assets may be determined. From these determined paths a map may be produced that shows all of the connections/paths that are (or could) be used by the asset during normal functioning. For example, an asset in the form of an application, may need to access data stored in a database stored on a different node or datacenter. In order to communicate with the datacenter, the asset (or the node hosting it) may have multiple indirect paths by which to communicate with the datacenter. Each of these paths are mapped in step 304 to produce one or more maps with each step that the asset communicated with the database.

In step 306, each path that an asset may use is analyzed and assigned a weight indicating the level of compliance.

This may be done with the help of ML or may be done by a rules-based system that provides a rank (such as, but not limited to, between 1 and 10 where 1 indicates no compliance and 10 indicates full compliance) for each step and then the average or lowest value rank is assigned to the path. Alternatively, the ML may determine by analyzing the paths what level of risk a particular path currently has or may be predicted to have based on a level of likelihood previously observed with similar paths. Any form of ranking may be used, which is based on predetermined rules or probabilities determined by the ML that may relate the level of compliance of one or more nodes and/or paths.

As a non-limiting example, assume a security policy has five criteria, two of which are critical and have a level of compliance between 1-10. If the assets traverse three nodes (A-C) with node A complying with all four of the criteria but not a fifth non-critical criteria, and node B and C, which are located in cloud environments complying with all five criteria, the method may assign a level of compliance (or rank) of nine to the path (the average of the three nodes: $(10+10+9)/3=9$). If, however, a second path includes node D that has a ranking of six because it is only in compliance with the critical policies, then that path may be given a rank of five. Other methods and ranges of numbers may be used to provide the levels/ranks, and this is only for explanation purposes.

In step 308, once each path is assigned a rank in step 306, the path with the highest ranking (highest determined level of compliance) is identified. In the above example, it would be the first path since it has a rank of nine. In one or more embodiments, the path with the lowest ranking (lowest determined level of compliance) may also be identified and/or other paths depending on user/administrator configuration and/or needs. Using these various rankings, a user/administrator/networking entity may be able to make decisions on upgrading, changing, or reconfiguring one or more nodes that the asset interacts with.

In step 310, a user or administrator is notified if there are any security policies that the highest-ranked path does not follow. This may be because of one or more nodes on the path are not compatible with specific aspects of the security policy, or because one or more nodes needs upgrading. By notifying the user/administrator/networking entity, appropriate changes to the nodes and/or alterations to the security policy may be made. In the case where one or more of the nodes cannot be upgraded, changes may be made, such as excluding aspects that are not compatible with the specific path, limiting access of the asset to secure nodes, altering the security policy for the highest ranking path to exclude any aspects that are not compatible with the highest ranking path, or performing some other preventative measure to protect sensitive data and/or maintain necessary security, while allowing the asset to continue to function. Additionally, one or more embodiments may restrict the use of the lowest or lower ranking paths.

Further, where each of the nodes may support a policy but have not implemented it, the user/administrator may cause those nodes that have not implemented the policy to implement it. For example, if one node is on a cloud environment that complies with policies A-E, while an intermediary node on an edge device complies with A-C, the administrator may cause that edge computing device to implement polices D and E so there is a uniform security policy across each of the asset's interactions.

Once the user is notified of the non-compliance regarding the policies in step 310. In certain instances, corrective actions may follow. After step 310, the method may end. In one or more alternative embodiments, the method is periodically or continually repeated to ensure continued compliance with the security policies.

Figure 4:
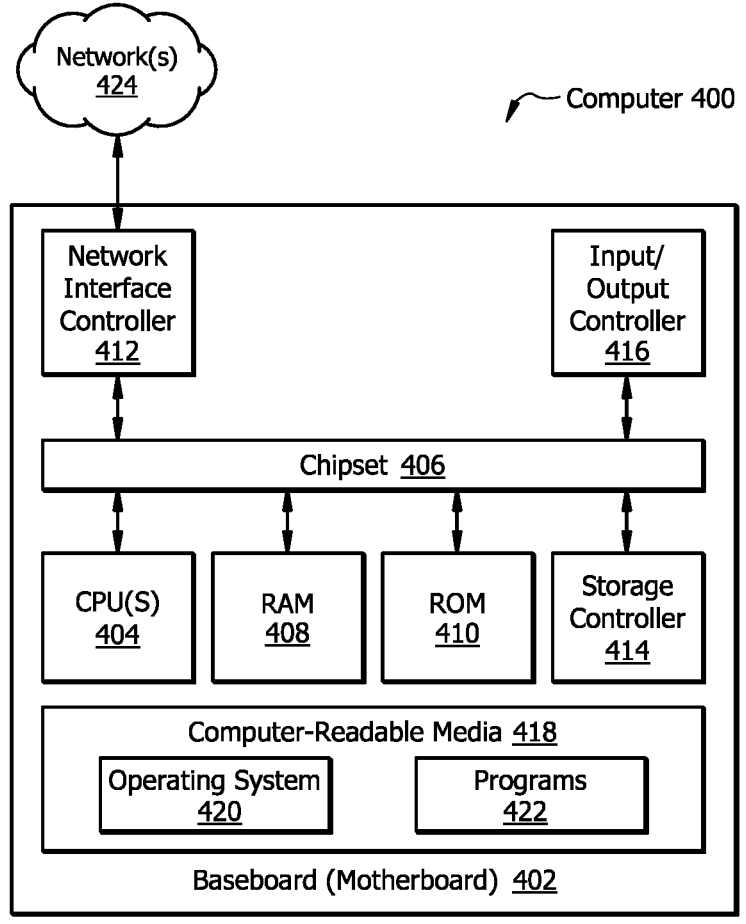
FIG. 4 illustrates a computer architecture diagram shown in an illustrative computer hardware architecture in accordance with at least one embodiment.

FIG. 4 shows an example computer architecture for a device capable of executing program components for implementing the functionality described above. The computer architecture shown in FIG. 4 illustrates any type of computer 400, such as a conventional server computer, workstation, desktop computer, laptop, tablet, network appliance, e-reader, smartphone, or other computing device and may be utilized to execute any of the software components presented herein. The computer 400, may, in some examples correspond to any of the devices such as the edge computing devices 122, client devices 124, local devices 126 as well as components of the cloud environments 110A-110N as shown in FIG. 1A), and/or any other device described herein, and may comprise personal devices (e.g., smartphones, tables, wearable devices, laptop devices, etc.), networked devices such as servers, switches, routers, hubs, bridges, gateways, modems, repeaters, access points, and/or any other type of computing device that may be running any type of software and/or virtualization technology.

The computer 400 includes a baseboard 402, or "motherboard," which is a printed circuit board to which a multitude of components or devices may be connected by way of a system bus or other electrical communication paths. In one illustrative configuration, one or more central processing units ("CPUs") 404 operate in conjunction with a chipset 406. The CPUs 404 may be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such a flip-flops, and electronic circuits that provide an output state based on the logical combination of the state of one or more other switching elements, such as logic gateway. These basic switching elements may be combined to create more complex logic circuits including registers, adders-subtractors, arithmetic logic units, floating-point units, and the like.

The chipset 406 provides an interface between the CPUs 404 and the remainder of the components and devices on the baseboard 402. The chipset 406 may provide an interface to a RAM 408, used as the main memory in the computer 400. The chipset 406 may further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM may also store other software components necessary for the operation of the computer 400 in accordance with the configurations described herein.

The computer 400 may operate in a networked environment using logical connection to remote computing devices and computer systems through a network, such as the network 130 shown in FIG. 1A. The chipset 406 may include functionality for providing network connectivity through a Network Interface (NIC) 412, such as a gigabit Ethernet adapter. The NIC 412 can connect the computer 400 to other computing devices over the network 424. It should be appreciated that multiple NICs 412 may be present in the computer 400, connecting the computer to other types of networks and remote computer systems.

The computer 400 may be connected to computer-readable media 418 or other forms of storage devices that provide non-volatile storage for the computer 400. The computer-readable media 418 may store an operating system 420, programs 422, and other data. The computer-readable media 418 may be connected to the computer 400 through a storage controller 414 connected to the chipset 406. The computer-readable media 418 may consist of one or more physical storage units. The storage controller 414 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the computer-readable media 418 by transforming the physical state of the physical storage units to reflect the information being stored. The specific transformation of physical state may depend on various factors, in different embodiments of this description. Examples of such factors may include, but are not limited to, the technology used to implement the physical storage units, whether the storage device is characterized as primary or secondary storage and the like.

For example, the computer 400 may store information to the computer readable media 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The computer 400 may further read information from the computer readable media 418 by detecting the physical states or characteristics of one or more locations within the physical storage units.

In addition to the computer-readable media 418 described above, the computer 400 may have access to other computer-readable storage media to store and retrieve information, such as program modules, data structures or other data. It should be appreciated by those skilled in the art that computer-readable storage media is any available media that provides for the non-transitory storage of data, and which may be accessed by the computer 400. In some examples, the operations performed by the client device (e.g., FIG. 1A, 124), Unified Portal (e.g., FIG. 1A, 140), and or any components included therein, may be supported by one or more devices similar to computer 400. Stated otherwise some or all of the operations performed by the API gateway, and or any components included therein, may be performed by one or more computer devices 400.

By way of example and not limitation, computer-readable storage media may include volatile and non-volatile, removable, and non-removable media implemented in a method or technology. Computer-readable storage media includes but is not limited to, RAM, ROM, erasable programmable ROM ("EPROM"), electrically-erasable programmable ROM ("EEPROM"), flash memory or other solid-state memory technology compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices, or any other medium that may be used to store the desired information in a non-transitory fashion.

As mentioned briefly above, the computer-readable media 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The computer-readable media 418 may store other system or application programs and data utilized by computer 400.

In one embodiment, the computer-readable media 418 or other computer-readable storage media is encoded with computer-executable instructions which, when loaded into the computer 400, transform the computer from a general-purpose computing system into a special-purpose computer capable of implementing the embodiments described herein. These computer executable instructions transform the computer 400 by specifying how the CPUs 404 transition between states, as described above. According to one embodiment, the computer 400 has access to computer-readable storage media storing computer-executable instructions which when executed by the computer 400, perform the various processes described above with regards to FIGS. 1-3. The computer 400 may also include computer-readable storage media with instructions stored thereupon for performing any of the other computer implemented operations described herein.

The computer 400 may also include one or more input/output controllers 416 for receiving and processing input from several input devices, such as a keyboard, a mouse, a touchpad, a touch screen, an electronic stylus, or other type of input device. Similarly, an input/output controller 416 may provide output to a display such as a computer monitor, a flat panel display, a digital projector, a printer, or another type of output device. It will be appreciated that the computer 400 may not include all of the components shown in FIGS. 1A and 1B, may include other components that are not explicitly shown in FIGS. 1A and 1B or may utilize an architecture completely different than that shown in FIGS. 1A and 1B.

The computer 400 may include one or more hardware processors 404 (CPUs) configured to execute one or more stored instructions. The processor(s) 404 may comprise one or more cores. Further, the computer 400 may include one or more network interfaces 412 configured to provide communications between the computer 400 and other devices. The network interface may include devices configured to couple to personal area networks (PANS), wired and wireless local area networks (LANS), wired and wireless wide area networks (WANs), and so forth. For example, the network interfaces may include devices compatible with Ethernet, WI-FI™, and so forth.

While the disclosure is described with respect to the specific examples, it is to be understood that the scope of the disclosure is not limited to these specific examples. Since other modifications and changes varied to fit particular operating requirements, and environments will be apparent to those skilled in the art, the disclosure is not considered limited to the example chosen for purposes of disclosure and covers changes and modifications which do not constitute departures from the true spirit and scope of this disclosure.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed:

1. A method, comprising:
identifying an asset;
receiving telemetry and logs from the asset;
determining from the telemetry and the logs, paths connecting the asset to other assets;
producing a map of the paths connecting the asset to the other assets;
analyzing, using a machine learning engine, the map to:
determine a current level of compliance with a security policy for each of the paths associated with the map,
predict a future level of use for each of the paths associated with the map based at least in part on a current level of congestion for each of the paths associated with the map, and
predict a future level of compliance with the security policy for each of the paths associated with the map;
wherein:
the machine learning engine uses a predictive analytics model that is configured to build a predictive model for congestion on each of the paths by considering a plurality of parameters, the plurality of parameters comprising a time of day, a number of clients, and a traffic load; and
the machine learning engine determines, using the predictive model, whether a particular path of the paths can be eliminated;
generating a ranking for each of the paths associated with the map based on the current level of compliance with the security policy, the future level of use, and the future level of compliance with the security policy; and
notifying a user of the ranking of each of the paths associated with the map.

2. The method of claim 1, wherein analyzing, using the machine learning engine, the map comprises identifying an aspect of the security policy that is currently not compatible with a specific path of the paths or predicted not to be compatible with the specific path of the paths.

3. The method of claim 2, wherein one or more nodes of the specific path are upgraded to comply with the identified aspect of the security policy.

4. The method of claim 1, further comprising determining, from the paths, a path that has a highest ranking and a path that has a lowest ranking and notifying the user of the path having the highest ranking and the path having the lowest ranking.

5. The method of claim 4, further comprising altering the security policy for the path having the highest ranking to exclude any aspects that are not compatible with the path having the highest ranking.

6. The method of claim 4, further comprising restricting use of the path with the lowest ranking.

7. The method of claim 1, wherein the asset is hosted in a cloud environment and the paths comprise at least one path between the cloud environment and an edge computing device.

8. The method of claim 1, wherein the paths comprise at least one path between a cloud environment and a local computing environment.

9. The method of claim 1, wherein the machine learning engine uses a cognitive analytics model to extract patterns of network use and system use.

10. A system, comprising:
one or more nodes hosting one or more assets; and
a unified portal which comprises:
one or more processors; and
memory storing one or more computer-readable non-transitory storage media coupled to the one or more processors and storing instructions operable when executed by one or more processors to cause the system to perform a method comprising:
identifying an asset;
receiving telemetry and logs from the asset;
determining from the telemetry and the logs, paths connecting the asset to other assets;
producing a map of the paths connecting the asset to the other assets;
analyzing, using a machine learning engine, the map to:
determine a current level of compliance with a security policy for each of the paths associated with the map,
predict a future level of use for each of the paths associated with the map based at least in part on a current level of congestion for each of the paths associated with the map, and
predict a future level of compliance with the security policy for each of the paths associated with the map;
wherein:
the machine learning engine uses a predictive analytics model that is configured to build a predictive model for congestion on each of the paths by considering a plurality of parameters, the plurality of parameters comprising a time of day, a number of clients, and a traffic load; and
the machine learning engine determines, using the predictive model, whether a particular path of the paths can be eliminated;
generating a ranking for each of the paths associated with the map path based on the current level of compliance with the security policy, the future level of use, and the future level of compliance with the security policy; and
notifying a user of the ranking of each of the paths associated with the map.

11. The system of claim 10, wherein analyzing, using the machine learning engine, the map comprises identifying an aspect of the security policy that is currently not compatible with a specific path of the paths or predicted not to be compatible with the specific path of the paths.

12. The system of claim 11, wherein one or more nodes of the specific path are upgraded to comply with the identified aspect of the security policy.

13. The system of claim 10, further comprising determining, from the paths, a path that has a highest ranking and a path that has a lowest ranking and notifying the user of the path with the highest ranking and the path with the lowest ranking.

14. The system of claim 13, further comprising altering the security policy for the path with the highest ranking to exclude any aspects that are not compatible with the path with the highest ranking.

15. The system of claim 13, further comprising restricting use of the path with the lowest ranking.

16. The system of claim 10, wherein the machine learning engine uses a cognitive analytics model to extract patterns of network use and system use.

17. The system of claim 10, wherein the nodes include at least one cloud environment node and at least one edge computing device node.

18. The system of claim 17, wherein at least one of the paths connects the at least one cloud environment node with the at least one edge computing device node.

19. The system of claim 10, wherein the one or more nodes includes a local computing environment.

20. At least one non-transitory computer-readable storage medium having stored therein instructions which, when executed by one or more processors, cause the one or more processors to:

identify an asset;

receive telemetry and logs from the asset;

determine from the telemetry and the logs, paths connecting the asset to other assets;

produce a map of the paths connecting the asset to the other assets;

analyze, using a machine learning engine, the map to:

determine a current level of compliance with a security policy for each of the paths associated with the map, predict a future level of use for each of the paths associated with the map based at least in part on a current level of congestion for each of the paths associated with the map, and predict a future level of compliance with the security policy for each of the paths associated with the map;

wherein:

the machine learning engine uses a predictive analytics model that is configured to build a predictive model for congestion on each of the paths by considering a plurality of parameters, the plurality of parameters comprising a time of day, a number of clients, and a traffic load; and the machine learning engine determines, using the predictive model, whether a particular path of the paths can be eliminated;

generate, a ranking for each of the paths associated with the map based on the current level of compliance with the security policy, the future level of use, and the future level of compliance with the security policy; and notify a user of the ranking of each of the paths associated with the map.

* * * * *